C. H. TAYLOR & H. E. COFFIN.
ROTARY VALVE FOR EXPLOSION ENGINES.
APPLICATION FILED JUNE 27, 1910.
1,052,530.  Patented Feb. 11, 1913.
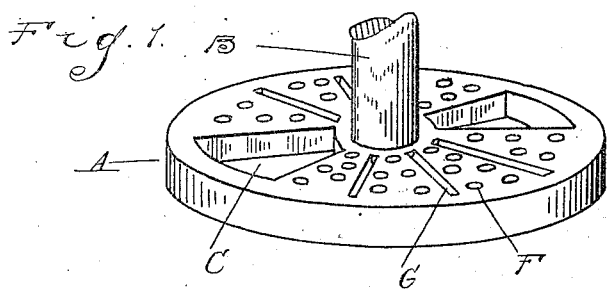
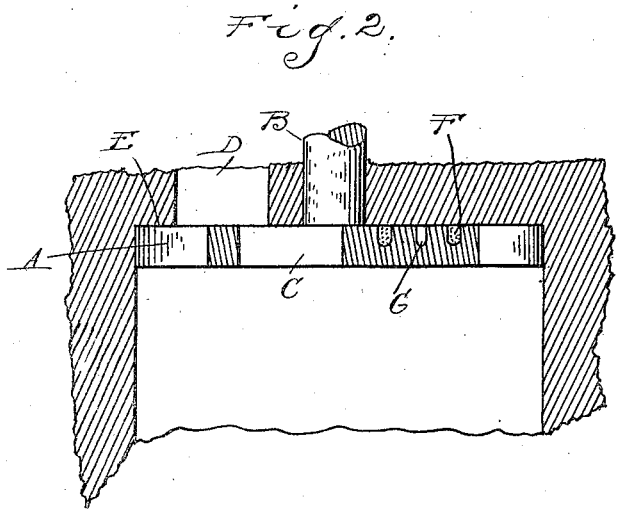
Inventors
Cecil Hamelin Taylor &
Howard E. Coffin

UNITED STATES PATENT OFFICE.

CECIL HAMELIN TAYLOR AND HOWARD E. COFFIN, OF DETROIT, MICHIGAN, ASSIGNORS, BY MESNE ASSIGNMENTS, TO REYNOLDS MOTOR COMPANY, OF DETROIT, MICHIGAN, A CORPORATION OF MICHIGAN.

ROTARY VALVE FOR EXPLOSION-ENGINES.

1,052,530.   Specification of Letters Patent.   Patented Feb. 11, 1913.

Application filed June 27, 1910. Serial No. 569,207.

*To all whom it may concern:*

Be it known that we, CECIL HAMELIN TAYLOR and HOWARD E. COFFIN, citizens of the United States of America, residing at Detroit, in the county of Wayne and State of Michigan, have invented certain new and useful Improvements in Rotary Valves for Explosion-Engines, of which the following is a specification, reference being had therein to the accompanying drawings.

The invention relates to rotary valves of the disk type and consists in the means employed for packing the valve as hereinafter set forth.

In the drawings,—Figure 1 is a perspective view of the valve. Fig. 2 is a section through the valve and its seat.

A is a disk valve, B is the rotary stem therefor and C is a port extending through the disk and adapted to register with a coöperating port D in the valve seat E. It is usual with valves of this type to introduce a liquid lubricant between the face of the valve and its seat which performs the additional function of sealing the valve. With the present construction a more effective seal is produced by the employment of a solid material of a lubricating nature which is deposited on the contacting faces of the valve and its seat. This material is preferably in the form of inserts in either the face of the valve or its seat or both.

As shown, F are the inserts of the solid lubricating material preferably graphite. This may be of any form but are shown as filling bearings in the face of the valve.

G is an unfilled recess preferably extending radially of the face of the valve, the function of which is to collect any surplus material deposited from the inserts F.

With the construction described in operation, the material of the inserts is smeared upon the face of the valve and its seat with the result that perfect contact is maintained. This will continue during the entire life of the valve, the coating being continually renewed as the contacting surfaces wear.

What we claim as our invention is:

1. The combination of a ported valve seat and a ported valve slidable over said seat, one of said members being provided with a restricted recess, said recess being closed at the bottom and ends to form a pocket for receiving particles lodged between the sliding faces.

2. The combination of a ported valve seat and a ported valve slidable over said seat, said valve being provided with a restricted recess in the face thereof intermediate the valve ports, said recess being closed at the bottom and ends to form a pocket for receiving particles lodged between the sliding faces.

3. The combination with a valve and its seat, of an insert of solid lubricating material in one of said members, and a recess in one of said members for collecting the surplus material.

4. The combination with a rotary disk valve, of an insert of solid lubricating material in said valve, and a recess in the face of the valve, for the purpose described.

In testimony whereof we affix our signatures in presence of two witnesses.

CECIL HAMELIN TAYLOR.
HOWARD E. COFFIN.

Witnesses:
  LENA M. CAILE,
  ETHEL J. ESSIG.